United States Patent
Mckell-Redwood et al.

(10) Patent No.: US 12,204,621 B2
(45) Date of Patent: Jan. 21, 2025

(54) PROVIDING VIRTUAL MACHINES FOR CENTRALIZED INTEGRATION WITH PERIPHERALS INCLUDING BIOMETRIC DEVICES

(71) Applicant: AMADEUS S.A.S., Biot (FR)

(72) Inventors: Colin Mckell-Redwood, Neu-Ulm (DE); Matt Parker Willingham, Orlando, FL (US); Nicolas Torres, West Drayton (GB); Michael Anthony Naylor, Poole (GB)

(73) Assignee: AMADEUS S.A.S., Biot (FR)

( * ) Notice: Subject to any disclaimer, the term of this patent is extended or adjusted under 35 U.S.C. 154(b) by 371 days.

(21) Appl. No.: 17/423,750

(22) PCT Filed: Oct. 6, 2020

(86) PCT No.: PCT/EP2020/077942
§ 371 (c)(1),
(2) Date: Jul. 16, 2021

(87) PCT Pub. No.: WO2021/069411
PCT Pub. Date: Apr. 15, 2021

(65) Prior Publication Data
US 2022/0121733 A1    Apr. 21, 2022

(30) Foreign Application Priority Data

Oct. 11, 2019   (FR) ........................................ 1911299

(51) Int. Cl.
*G06F 21/32*    (2013.01)
*G06F 9/455*    (2018.01)
(Continued)

(52) U.S. Cl.
CPC .......... *G06F 21/32* (2013.01); *G06F 9/45558* (2013.01); *G06F 21/53* (2013.01); *G06F 21/6209* (2013.01); *G06F 2009/45587* (2013.01)

(58) Field of Classification Search
CPC ...... G06F 21/32; G06F 9/45558; G06F 21/53; G06F 21/6209; G06F 2009/45587
See application file for complete search history.

(56) References Cited

U.S. PATENT DOCUMENTS 8,793,117 B1 * 7/2014 Varshney ................ H04L 69/12
              718/1
10,360,051 B2 * 7/2019 Authement ........... G06F 3/0664
(Continued)

FOREIGN PATENT DOCUMENTS

JP    2011215688 A    10/2011
JP    2017535833 A    11/2017
(Continued)

OTHER PUBLICATIONS

PCT International Search Report, Jan. 11, 2021 re PCT International Patent Application No. PCT/EP2020/077942.
(Continued)

*Primary Examiner* — Kambiz Zand
*Assistant Examiner* — Afaq Ali
(74) *Attorney, Agent, or Firm* — Perry + Currier Inc.

(57) ABSTRACT

Systems for providing a virtual machine and authentication of a user using the virtual machine may perform operations including providing an application programming interface (API) to an electronic device; booting a virtual machine configured to emulate a type of electronic device based on a workstation to which the electronic device is connected; receiving input, using the API, from the electronic device; and providing output to the workstation using the virtual (Continued)

machine. In another example, the operations may include connecting, via at least one network and through an API, to a remote server; providing to the remote server, via the at least one network and the API, the captured biometric indicator; receiving, from a virtual machine executed on the remote server, at least one packet in a defined format based on the biometric indicator; and forwarding the received at least one packet to a workstation communicably connected to the electronic device.

11 Claims, 8 Drawing Sheets

(51) Int. Cl.
  *G06F 21/53* (2013.01)
  *G06F 21/62* (2013.01)

(56) References Cited

U.S. PATENT DOCUMENTS

| | | | | |
|---|---|---|---|---|
| 2003/0208748 | A1* | 11/2003 | Levin | G06F 9/45504 |
| | | | | 717/134 |
| 2005/0246453 | A1* | 11/2005 | Erlingsson | G06F 9/45558 |
| | | | | 710/1 |
| 2008/0302870 | A1* | 12/2008 | Berini | H04L 63/0861 |
| | | | | 235/380 |
| 2012/0013547 | A1 | 1/2012 | Tsirkin et al. | |
| 2012/0314018 | A1 | 12/2012 | Wengrovitz et al. | |
| 2015/0066342 | A1* | 3/2015 | Garzella | G06Q 10/06311 |
| | | | | 434/30 |
| 2016/0300414 | A1 | 10/2016 | Lambert et al. | |
| 2017/0039037 | A1* | 2/2017 | Howett | G06F 9/452 |
| 2018/0314563 | A1 | 11/2018 | Shimura et al. | |
| 2018/0337907 | A1* | 11/2018 | Bhansali | H04L 9/3231 |
| 2019/0102407 | A1* | 4/2019 | Young | G06F 3/04815 |
| 2019/0197220 | A1* | 6/2019 | Anderson | G09B 7/00 |
| 2019/0362398 | A1* | 11/2019 | Greenberger | G06F 3/04883 |
| 2020/0250571 | A1* | 8/2020 | Almasan | G06Q 30/018 |
| 2021/0014683 | A1* | 1/2021 | Obaidi | H04W 12/069 |
| 2021/0117524 | A1* | 4/2021 | McKell-Redwood | |
| | | | | H04L 9/3231 |
| 2022/0067147 | A1* | 3/2022 | Schmid | G06F 9/45558 |

FOREIGN PATENT DOCUMENTS

| | | |
|---|---|---|
| JP | 2018185676 A | 11/2018 |
| WO | 2015071325 A1 | 5/2015 |

OTHER PUBLICATIONS

PCT Written Opinion of the International Searching Authority, Jan. 11, 2021 re PCT International Patent Application No. PCT/EP2020/077942.

* cited by examiner

PROVIDING VIRTUAL MACHINES FOR CENTRALIZED INTEGRATION WITH PERIPHERALS INCLUDING BIOMETRIC DEVICES

FIELD

The present disclosure relates generally to virtualization techniques. In particular, this disclosure relates to providing authentication of a user using a virtual machine integrated with a centralized repository.

BACKGROUND

Traditional biometric techniques do not scale well to multi-party industries, such as airlines. Such industries involve a plurality of machines (e.g., provided by an airline, by an airport, by security vendors, by government agencies, and others), and these machines are often configured according to a variety of proprietary formats.

Moreover, although the machines may be updated to use the proprietary formats of other machines, many of the actors involved (e.g., provided by an airline, by an airport, by security vendors, by government agencies, and others) do not desire to share documentation on their proprietary formats. Indeed, releasing details of the proprietary formats may involve security risks. For example, if an unauthorized party intercepts details of the proprietary format used for airline ticket information, the unauthorized party may counterfeit airline tickets.

SUMMARY

A need therefore exists for a system that can integrate these machines without the need for custom-built solutions, and can perform integration while preserving security of any proprietary formats involved. As disclosed herein, systems and methods for machine virtualization can provide techniques for integration and authentication that overcome the deficiencies of existing approaches.

Embodiments of the present disclosure describe systems and methods for providing a virtual machine with connectivity to an authentication or identity verification service. This virtual machine may provide a secure mechanism for integration of different machines using different formats in an industry, such as airlines. In addition, the virtual machine may allow for actors to keep the details of their formats confidential.

According to particular modes of realization:
at least one memory storing instructions.
at least one processor configured to execute the instructions to perform operations comprising providing an application programming interface (API) to an electronic device, booting a virtual machine configured to emulate a type of electronic device based on a workstation to which the electronic device is connected, receiving input, using the API, from the electronic device, and providing output to the workstation using the virtual machine.

In some examples, the input comprises at least one biometric indicator of a user.

In some examples, the output comprises a verification of the at least one biometric indicator.

In some examples, the verification further includes data regarding a scheduled flight associated with the user.

In some examples, the verification further includes data regarding a scheduled event associated with the user.

In some examples, the verification further includes data regarding a scheduled academic examination associated with the user.

In some examples, the output is formatted in accordance with a format associated with the workstation.

In some examples, the format associated with the workstation comprises an Aircraft Electronics Association format.

In some examples, the workstation comprises a server associated with an airline.

In some examples, the output is provided to the workstation by passing the output to the electronic device that forwards the output to the workstation.

In some examples, providing output further comprises: transmitting the input to a remotely hosted identity service, wherein the identity service is configured to compare the input with stored data; in response, receiving an output from the identity service, wherein the output is based on the comparison; and reformatting the output from the identity service for output to the workstation using the virtual machine.

In some examples, the input comprises at least one biometric indicator of a user, and the at least one processor is configured to reformat the input before transmitting in accordance with a format associated with the identity service.

According to an embodiment, the following is provided:
at least one sensor configured to capture a biometric indicator of the user;
at least one memory having instructions stored thereon;
at least one processor configured to execute the instructions to perform operations comprising connecting, via at least one network and through an application programming interface (API), to a remote server, providing to the remote server, via the at least one network and through the API, the captured biometric indicator, receiving, from a virtual machine executed on the remote server, at least one packet in a defined format based on the biometric indicator, and forwarding the received at least one packet to a workstation communicably connected to the electronic device.

In some examples, the at least one sensor comprises a camera and the biometric indicator comprises at least one image of a portion of a face of the user.

In some examples, the at least one sensor comprises a fingerprint scanner and the biometric indicator comprises at least a portion of a fingerprint of the user.

In some examples, the at least one sensor comprises an eye tracker and the biometric indicator comprises at least a portion of a scan of an eye of the user.

In some examples, the at least one sensor comprises a barcode scanner and the biometric indicator comprises information related to the user encoded in a barcode.

In some examples, the at least one network comprises a private computer network.

In some examples, the defined format comprises an Aircraft Electronics Association format.

In some examples, the workstation comprises a server associated with an airline.

BRIEF DESCRIPTION OF THE DRAWINGS

The attached drawings illustrate the invention.

DETAILED DESCRIPTION

Figure 1:
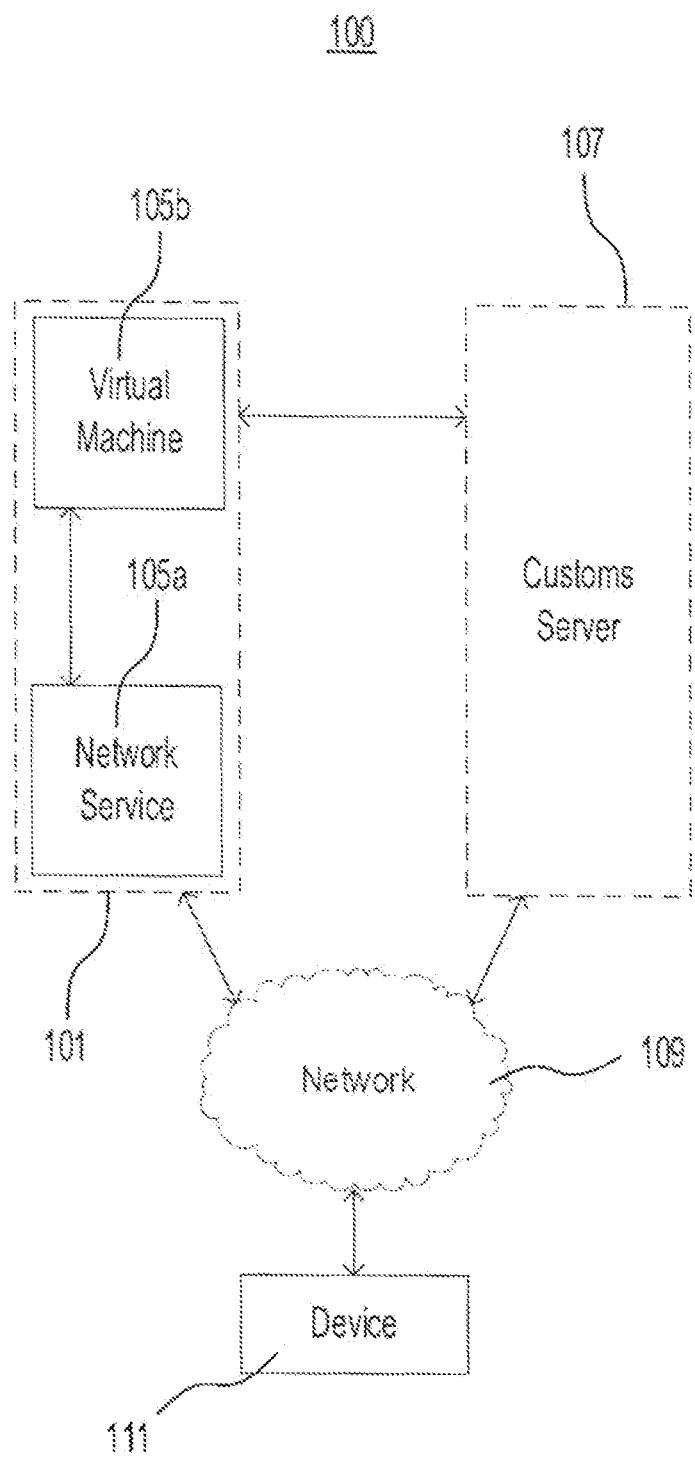
FIG. 1 represents a system for providing a virtual machine with a centralized repository.

A variety of peripheral devices may be involved in authenticating a user. For example, in an airport or other transportation hub, one peripheral, such as a biometric device or other device linked to a government repository, may verify a person against a customs database, a national security database, or the like. Moreover, a different peripheral, such as a barcode scanner or other device linked to an airline database or the like, may verify a person against an airline passenger list or the like. Other peripherals may verify information related the person against one or more databases.

However, such devices are generally not integrated with each other or even with the database against which the person is being verified and they are not integrated with other verification systems, resulting in numerous redundancies and an inability to use an integrated verification system, e.g., using biometrics. Moreover, these devices often communicate using proprietary formats and verify against confidential information in the databases. Thus, integration is not readily achievable.

The envisioned systems and methods can provide integration of such devices into an integrated system, e.g., based on biometrics or other authenticating information. Moreover, embodiments of the present disclosure may also cooperate using the proprietary formats and the confidential databases without compromising security thereof. For example, the envisioned systems and methods can provide a virtual machine. The systems and methods can provide an application programming interface (API) to an electronic device and boot a virtual machine configured to emulate a type of electronic device (e.g., a fingerprint reader, a barcode scanner, a camera, or the like) based on a workstation to which the electronic device is connected (e.g., a server associated with an airline). The systems and methods may further receive input (e.g., at least one biometric indicator of a user), using the API, from the electronic device and provide output (e.g., a verification of the at least one biometric indicator) to the workstation using the virtual machine. In addition, the envisioned systems and methods can use a virtual machine for providing connectivity to a user authentication or identity verification service. For example, the envisioned systems may connect to a remotely hosted identity-as-a-service (IDaaS). The systems and methods can connect, via at least one network and through an application programming interface (API), to a remote server and provide to the remote server, via the at least one network and through the API, a captured biometric indicator (e.g., from a camera, a fingerprint scanner, an eye tracker, a barcode scanner, or the like). The systems and methods may further receive, from a virtual machine executed on the remote server, at least one packet in a defined format based on the biometric indicator and forward the received at least one packet to a workstation communicably connected to the electronic device.

The envisioned systems and methods improve upon existing authentication systems, e.g., those used in airports or other transportation hubs. For example, the envisioned systems and methods can provide integration of different systems, such as those provided by a government, those provided by an airline, those provided by an airport, and the like, into a single, seamless system. Also, the integration does not require actors to reveal proprietary data formats or confidential databases. In contrast, existing systems lack this security provided by the envisioned systems and methods. These improvements are enabled, at least in part, by the specific architecture disclosed herein.

As used herein, the term "biometric" may refer to any information inherently unique (or quasi-unique) to a person. For example, a biometric may include a fingerprint, an eye scan, a facial recognition signature, a handwriting analysis, or the like. A "biometric" may be contrasted with any information artificially unique (or quasi-unique) to a person, e.g., a national identification number, a reservation number, or the like.

FIG. 1 depicts a system 100 for providing a virtual machine with a centralized repository, consistent with disclosed embodiments. As depicted in FIG. 1, a remote server 101 can provide a network service 105a and a virtual machine 105b. Although depicted with a single network service and a single virtual machine, remote server 101 may provide a plurality of network services (e.g., one or more for each electronic device electronically connected thereto) and a plurality of virtual machines (e.g., one or more for each electronic device and each workstation in communication therewith). Remote server 101 may comprise any computing device configured to host virtual machines, e.g., device 600 of FIG. 6 or the like. Electronic device 111 may comprise any device receiving authentication information from a user. In some embodiments, electronic device 111 may comprise a barcode reader, a QR code scanner, or the like. Additionally or alternatively, electronic device 111 may comprise a biometric reader, such as a camera, fingerprint reader, eye tracker, or the like. Electronic device 111 and remote server 101 may connect across one or more networks, e.g., network 109. The network(s) 109 can be any type of network (including infrastructure) that provides communications, exchanges information, and/or facilitates the exchange of information, such as the Internet, a local area network (LAN), or other suitable connection(s). In embodiments where remote server 101 connects to a plurality of electronic devices, each device may connect to remote server 101 across the same network or different networks. In some embodiments, each device may share a portion of the network (e.g., a backbone connected to remote server 101) while other portions may differ (e.g., different hubs of a wireless network).

Electronic device 111 can be configured to connect to an application programming interface (API) provided by remote server 101. For example, virtual machine 105b may create the API and provide the same through network server 105a. Virtual machine 105b may be configured to emulate a driver for electronic device 111.

Electronic device 111 may provide a biometric indicator or other input data to virtual machine 105b. In response, virtual machine 105b can be configured to communicate with customs server 107 to verify the received biometric indicator. Customs server 107 may comprise any computing device storing or accessing a database against which biometric or other authenticating information may be verified, e.g., device 600 of FIG. 6 or the like. Virtual machine 105*b* may communicate with customs server 107 across one or more networks. The network(s) can be any type of network (including infrastructure) that provides communications, exchanges information, and/or facilitates the exchange of information, such as the Internet, a local area network (LAN), or other suitable connection(s). Virtual machine 105*b* may encrypt the communications with customers server 107. Additionally or alternatively, a private connection between virtual machine 105*b* and customs server 107 may provide security.

Customs server 107 can then return confirmation to virtual machine 105*b*, which can in turn return confirmation to electronic device 111. Additionally or alternatively, customs server 107 may communicate the confirmation to a workstation associated either directly or indirectly with electronic device 111. For example, the workstation may comprise a server (e.g., device 600 of FIG. 6 or the like) associated with an airline, that airline using the device for capture of the biometric or other indicator.

Virtual machine 105*b* may use a closed-source library to convert the received biometric indicator to an appropriate format for use with customs server 107. For example, customs server 107 may require requests for confirmation in a proprietary format and, accordingly, by using a closed-source black-box, virtual machine 105*b* may ensure that the proprietary format is not revealed to the operator of virtual machine 105*b*. Additionally or alternatively, the operator of virtual machine 105*b* may receive specifications for the proprietary form and use the specifications to convert the received biometric indicator to an appropriate format for use with customs server 107.

Figure 2A:
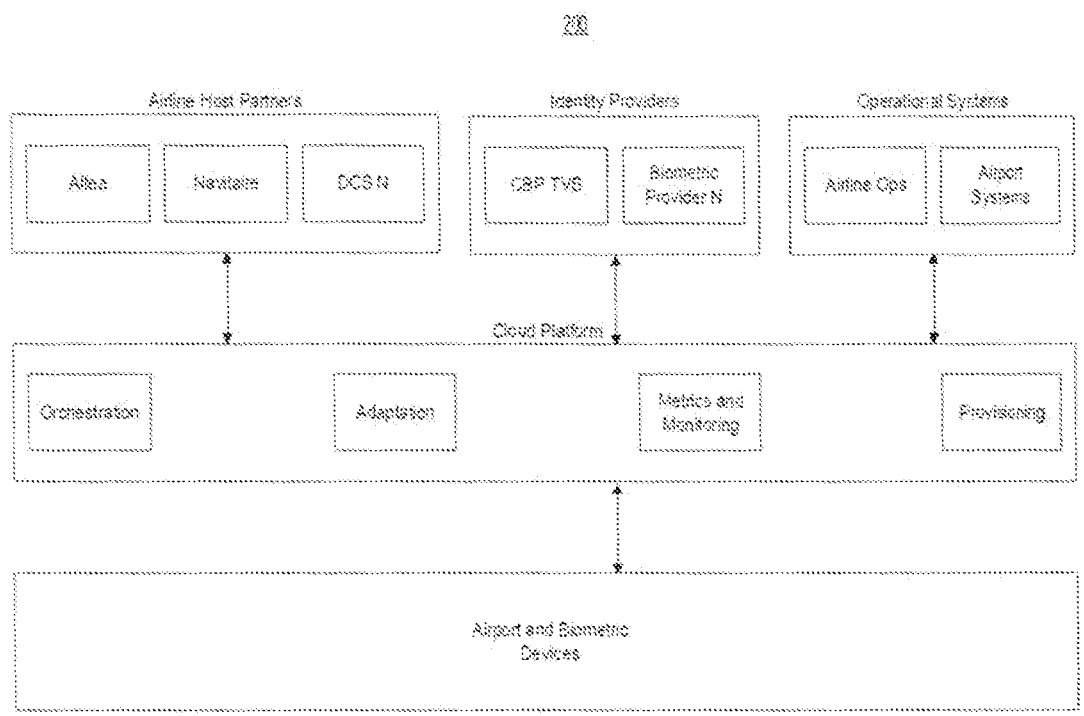
FIG. 2a represents a system for providing a virtual machine through a software-as-a-service platform.

FIG. 2A depicts an example system 200 in which a cloud server (e.g., remote server 101 as depicted in FIG. 1) provides a remote and singular platform between airport- and airline-specific hardware (e.g., biometric devices and other devices as depicted in FIG. 2A) and external identity providers, host partners, operational systems, and other external vendors. In the example of FIG. 2A, identity providers may include the Traveler Verification Service (TVS) from Customs and Border Patrol (CBP) or any other biometric provider N. Moreover, in the example of FIG. 2A, host partners may include Altéa®, Navitaire®, or any other departure control system (DOS) N.

As depicted in FIG. 2A, the cloud platform may orchestrate communications between the biometric devices and other devices and the identity providers, host partners, operational systems, and other external vendors. For example, as explained with respect to FIG. 1, virtual applications hosted on the cloud platform may operate biometric devices and other devices as well as connect to identity providers, host partners, operational systems, and other external vendors. Thus, the cloud platform may receive inputs from the biometric devices and other devices, verify said inputs against remote machines operated by identity providers, host partners, operational systems, and other external vendors, and provide corresponding commands to the biometric devices and other devices.

Figure 2B:
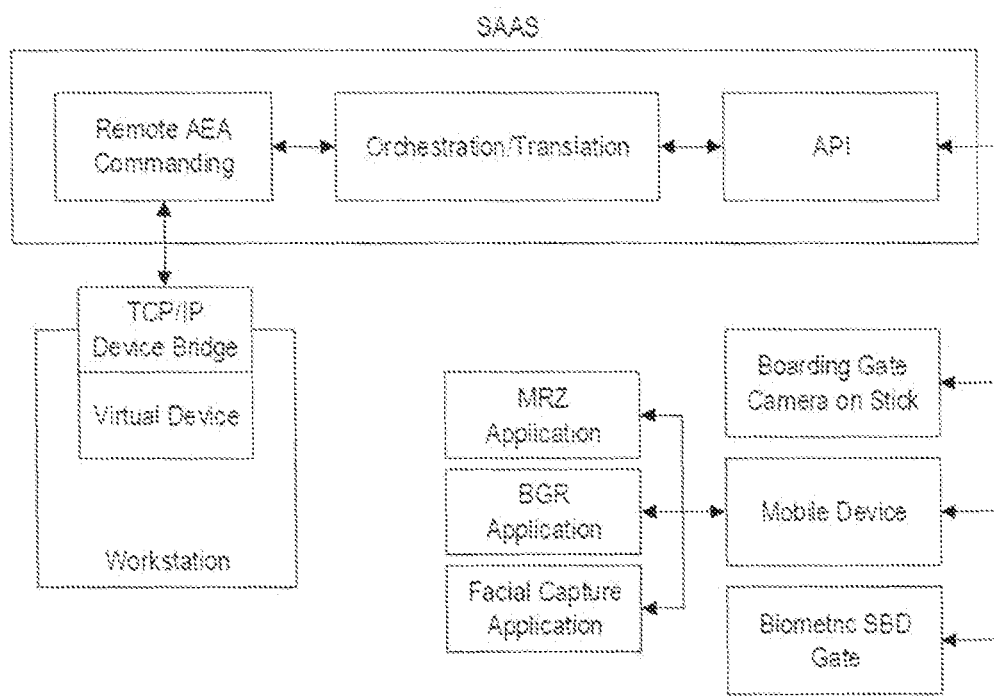
FIG. 2b represents a system for providing a virtual machine through a software as a service platform.

As further depicted in FIG. 2B, the cloud platform may adapt communications between the biometric devices and other devices and the identity providers, host partners, operational systems, and other external vendors. For example, as explained with respect to FIG. 1, virtual applications hosted on the cloud platform may manage data conversions such that the biometric devices and other devices may use native file formats with the cloud platform properly re-packaging such files before providing the same to the identity providers, host partners, operational systems, and other external vendors for verification. Similarly, the virtual applications hosted on the cloud platform may manage data conversions such that the identity providers, host partners, operational systems, and other external vendors for verification may provide commands in native formats with the cloud platform properly re-packaging such commands before providing the same to the biometric devices and other devices. The cloud platform may thus provision the biometric devices and other devices for cooperation with the identity providers, host partners, operational systems, and other external vendors.

In one example, the cloud platform may transmit input (e.g., from biometric devices or any other electronic device) to a remotely hosted identity service (e.g., an IDaaS), wherein the identity service is configured to compare the input with stored data. For example, the identity service may compare the input with stored biometric data or with any other identification data. In response, the cloud platform may receive an output from the identity service, wherein the output is based on the comparison. For example, the identity service may use an exact match for comparison or a fuzzy match. In using a fuzzy match, the identity service may require a matching percentage or other matching score between the input and the stored data to exceed a threshold (e.g., at least 60% similar, 70% similar, or the like). Accordingly, the output may indicate if a match was confirmed. Additionally, in some embodiments, the output may indicate the degree of match, as described above. Moreover, as discussed above, the cloud platform may reformat the output from the identity service for output to the workstation using the virtual machine.

In FIG. 2A, the cloud platform may additionally provide metrics and monitoring of both the biometric devices and other devices as well as the identity providers, host partners, operational systems, and other external vendors. For example, the cloud platform may track verification percentages for the identity providers, host partners, operational systems, and other external vendors, as well as average times for verifications and average latency for communications into and out of the identity providers, host partners, operational systems, and other external vendors. Additionally or alternatively, the cloud platform may track a number of persons registered by the biometric devices and other devices, as well as average times for boarding and average latency for communications into and out of the biometric devices and other devices.

FIG. 2B depicts a system 250 that provides a virtual machine for integrating peripherals through a software-as-a-service (SAAS) scheme, consistent with disclosed embodiments. SAAS platform may comprise one or more remote servers, e.g., remote server 101 of FIG. 1. Similar to remote server 101, SAAS platform may provide an API using a virtual machine to one or more peripherals over one or more networks. The network(s) can be any type of network (including infrastructure) that provides communications, exchanges information, and/or facilitates the exchange of information, such as the Internet, a local area network (LAN), or other suitable connection(s). As depicted in FIG. 2B, the peripherals may include a camera (e.g., at a boarding gate of an airport), a mobile device (e.g., a tablet, a mobile phone, or the like), or a biometric reader (e.g., the Schlage® Biometric Reader (SBR) gate or the like).

Although depicted as sharing an API, in some embodiments, SAAS platform may provide different APIs to different peripherals.

As further depicted in FIG. 2B, SAAS platform may orchestrate confirmation of any input from the peripheral(s) against one or more databases (e.g., a database of customs server 107 of FIG. 1 or the like). Additionally, SAAS platform may translate input from the peripheral(s) or confirmation from the one or more databases into any predefined format (e.g., an Aircraft Electronics Association (AEA) format). Accordingly, SAAS platform may provide remote AEA commands (or other appropriately formatted commands) to workstation systems. For example, as depicted in FIG. 2B, the workstation may comprise a virtual device connected to SAAS platform through a transmission control protocol/Internet protocol (TCP/IP) bridge or any other bridge over one or more networks. Although depicted as conceptually separate in FIG. 2B, the virtual device may be executed on the SAAS platform and control the workstation through one or more drivers (e.g., as depicted with virtual machine 105b in FIG. 1).

Figure 3:
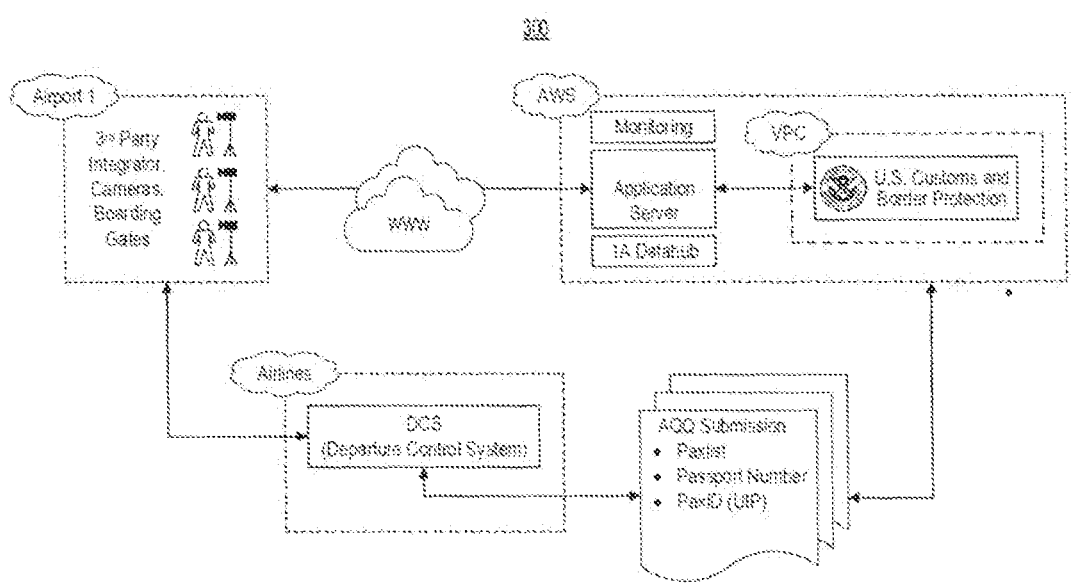
FIG. 3 represents an exemplary schematic showing the use of a virtual machine according to the present disclosure in an airport environment.

FIG. 3 depicts a system 300 that uses a virtual machine to provide integrated biometric authentication at an airport, consistent with disclosed embodiments. In the example of FIG. 3, a camera, boarding gate biometric reader, or other biometric peripheral is used to first enroll a passenger on a customs list and then verify the same passenger during travels. First, a passenger may enroll using existing information on a departure control system of an airline or may provide biometric information at a point-of-purchase. In either embodiment, the departure control system may receive a command to register the passenger (and may also receive the biometric information to register) over one or more networks. The network(s) can be any type of network (including infrastructure) that provides communications, exchanges information, and/or facilitates the exchange of information, such as the Internet, a local area network (LAN), or other suitable connection(s).

The departure control system may therefore register the passenger on a customs list, e.g., using an Advanced Passenger Information System (APIS) quick query (AQQ). The list may be accessible using a virtual private client (VPC) that may securely access the customs list.

Second, a passenger may verify her identity during travel by provided biometric information to a camera, boarding gate biometric reader, or other biometric peripheral. The peripheral may communicate the information to an API of an application server (e.g., operating a virtual machine as described above with respect to remote server 101 of FIG. 1, SAAS platform of FIG. 2, or the like). Although depicted as provided on Amazon Web Services (AWS), any platform allowing booting of virtual machines may be used.

In response, the virtual machine on the application server may verify the biometric information against the customs list, e.g., by securely sending the information to a VPC having access to the customs list. Accordingly, the biometric information may be verified without directly exposing either the information or an access port to the customs list. Moreover, as explained with respect to virtual machine 105b of FIG. 1, the virtual machine of the application server may format and return confirmation of the biometric information to the biometric peripheral. Additionally or alternatively, although not depicted in FIG. 3, the application server may format and return the confirmation to a workstation of the airport.

Figure 4:
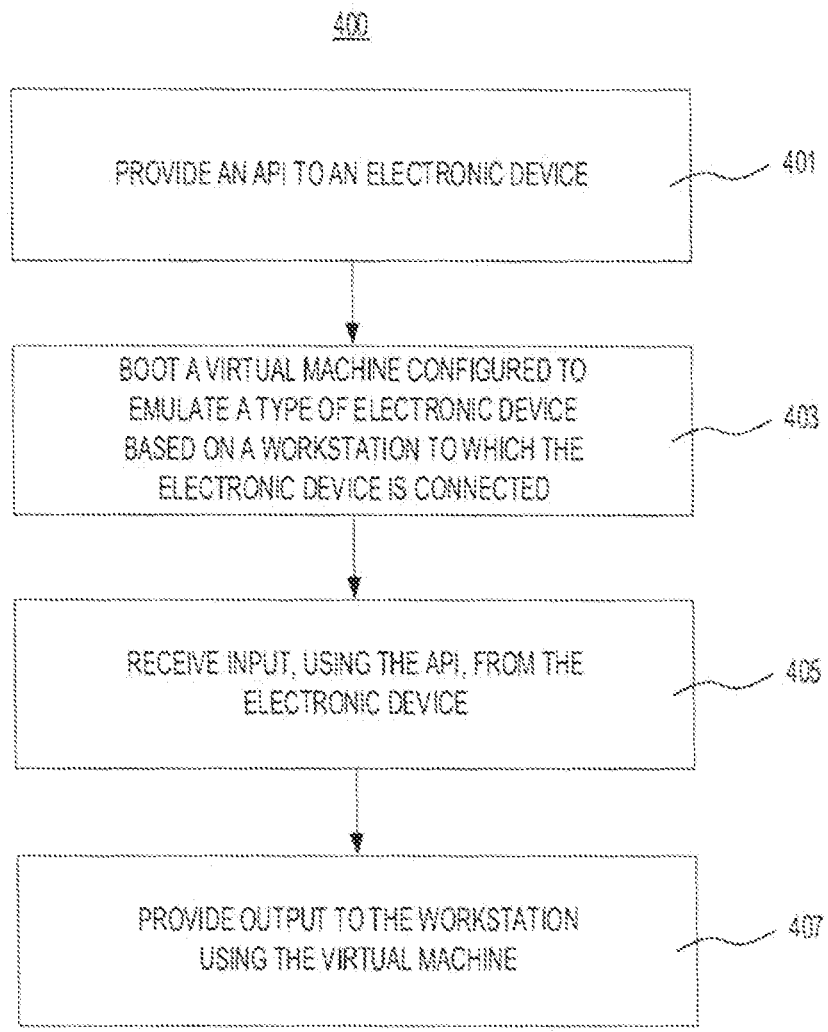
FIG. 4 represents a flowchart illustrating an exemplary method 400 for providing a virtual machine.

FIG. 4 depicts a flowchart illustrating an exemplary method 400 for providing a virtual machine, consistent with disclosed embodiments. In some embodiments, method 400 can include steps of providing an application programming interface (API), booting a virtual machine, receiving input using the API, and providing output using the virtual machine. As would be recognized by one of skill in the art, this particular sequence of steps is not intended to be limiting. The steps of method 400 can be combined or divided, and method 400 can include additional steps or fewer steps, without departing from the envisioned embodiments. Method 400 may be executed by at least one processor (e.g., processor(s) 601a and/or 601b of device 600 of FIG. 6). For example, the at least one processor may execute instructions stored on at least one non transitory memory, and the at least one processor and the at least one non transitory memory may comprise at least one server providing cloud services.

The system can be configured to provide an application programming interface (API) to an electronic device in step 401. For example, as explained above with respect to FIGS. 1 and 2 and below with respect to step 403, the API may provide access to a virtual machine hosted on the system. The virtual machine may provide the API across one or more networks, e.g., a private computer network.

In some embodiments, the electronic device may comprise a biometric peripheral. For example, the electronic device may comprise a camera, a fingerprint reader, an eye tracker, or the like. Additionally or alternatively, the electronic device may comprise a barcode reader, a QR code scanner, or the like.

After step 401, the system can be configured to boot a virtual machine configured to emulate a type of electronic device based on a workstation to which the electronic device is connected in step 403. For example, the workstation may comprise a server associated with an airline. The type of electronic device may comprise a particular model or the like of an electronic device. Accordingly, the virtual machine may emulate a particular model of a fingerprint reader or the like but open an API to a fingerprint reader that is a different model. Accordingly, the fingerprint reader may operate as usual but appear to any device connected to the virtual machine as a different fingerprint reader.

After step 403, the system can be configured to receive input, using the API, from the electronic device in step 405. For example, the input may comprise at least one biometric indicator of a user.

After step 405, the system can be configured to provide output to the workstation using the virtual machine in step 407. For example, the output may comprise a verification of the at least one biometric indicator. Furthermore, the output may be formatted in accordance with a format associated with the workstation, e.g., an Aircraft Electronics Association format.

In some embodiments, the verification may further include data regarding a scheduled flight associated with the user. For example, a flight number, a time of departure, a gate of departure, or the like may be encoded into the output based on the format. Additionally or alternatively, the verification may further include data regarding a scheduled event associated with the user. For example, an event time, an event location, or the like may be encoded into the output based on the format. Additionally or alternatively, the verification may further include data regarding a scheduled academic examination ("exam") associated with the user. For example, an exam time, an exam location, or the like may be encoded into the output based on the format. Accordingly, although described with reference to airports, any other system relying on biometric information to verify a user, such as an exam system, an event registration (or ticketing) system, or the like, may employ the virtualization systems herein to seamlessly integrate different peripherals.

Method 400 may further include additional steps not shown in FIG. 4. For example, method 400 may include passing the output to the electronic device that forwards the output to the workstation in addition to or in lieu of step 407.

Figure 5:
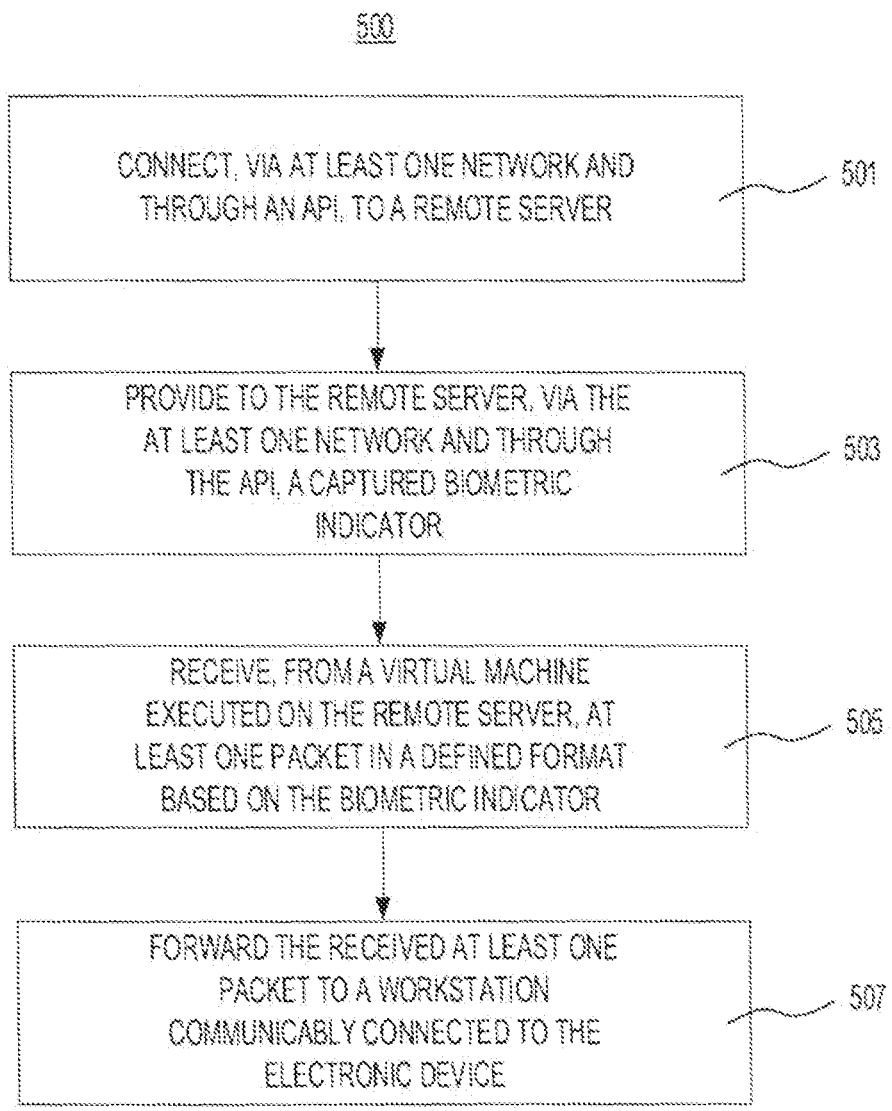
FIG. 5 represents a flowchart illustrating an exemplary method 500 for authenticating a user with a virtual machine.

FIG. 5 depicts a flowchart illustrating a method 500 for authenticating a user using a remote authentication or identity verification service via a virtual machine, consistent with disclosed embodiments. In some embodiments, method 500 can include steps of connecting to a remote server, providing to the remote server a captured biometric indicator, receiving from a virtual machine executed on the remote server at least one packet in a defined format based on the biometric indicator, and forwarding the received at least one packet to a workstation communicably connected to an electronic device. As would be recognized by one of skill in the art, this particular sequence of steps is not intended to be limiting. The steps of method 500 can be combined or divided, and method 500 can include additional steps or fewer steps, without departing from the envisioned embodiments. Method 500 may be executed by at least one processor (e.g., processor(s) 601*a* and/or 601*b* of device 600 of FIG. 6).

The system can be configured to connect, via at least one network and through an application programming interface (API), to a remote server in step 501. For example, as explained above with reference to FIGS. 1 and 2, the at least one network may any type of network (including infrastructure) that provides communications, exchanges information, and/or facilitates the exchange of information, such as the Internet, a local area network (LAN), or other suitable connection(s). In some embodiments, the network may comprise a private computer network.

After step 501, the system can be configured to provide to the remote server, via the at least one network and through the API, an indicator from at least one sensor configured to capture a biometric indicator of the user in step 503. For example, as explained with respect to FIGS. 1 and 2, the virtual machine may receive input from an electronic device including the at least one sensor, and the biometric indicator may comprise a portion of the input.

In some embodiments, the electronic device may comprise a biometric peripheral. For example, the electronic device may comprise a camera, a fingerprint reader, an eye tracker, or the like. Additionally or alternatively, the electronic device may comprise a barcode reader, a QR code scanner, or the like.

After step 503, the system can be configured to receive, from a virtual machine executed on the remote server, at least one packet in a defined format based on the biometric indicator in step 505. For example, the defined format may comprise an Aircraft Electronics Association format. Moreover, the system may use a proprietary library to perform the formatting, thus preserving confidentiality of the format itself.

After step 505, the system can be configured to forward the received at least one packet to a workstation communicably connected to the electronic device in step 507. For example, the workstation may comprise a server associated with an airline.

Method 500 may omit step 507 in embodiments where the virtual machine communicates directly with the workstation.

In some embodiments, method 400 can be provided by a remote sever (e.g., remote server 101 of FIG. 1, SAAS platform of FIG. 2, or the like) while method 500 can be executed by an electronic device (e.g., a biometric peripheral or the like) connected to the remote server. Accordingly, methods 400 and 500 may cooperate to verify users on a centralized repository by seamless integrating different biometric peripherals through virtualization.

The preceding disclosure describes embodiments of a system for providing a virtual machine and authenticating a user using a remote authentication or identity verification service via a virtual machine. Such a system can generally be used to integrate database services with biometric devices in an airport environment as described in FIG. 3. For example, an electronic device can be configured to capture biometric data from a traveler. In this non-limiting example, the electronic device may process the biometric data using a virtual device on a remote server. In another example, the electronic device may operate through a system-as-a-service platform such that a virtual device appears to be running locally on the electronic device. In either non-limiting example, the remote server (or system-as-a-service platform) may verify the biometric data and return authorization to one or more workstations according to particular formats used by those workstations.

Figure 6:
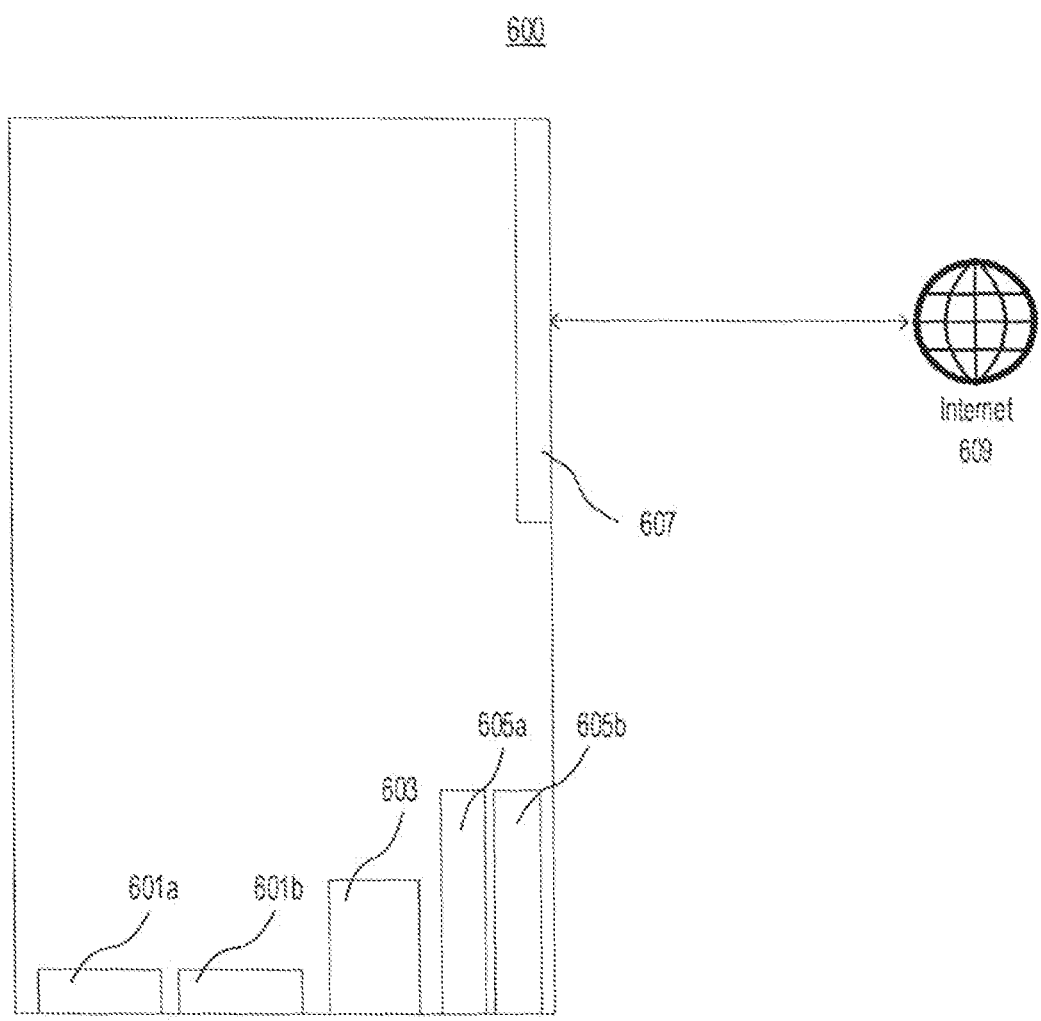
FIG. 6 represents a block diagram of an example device with which the systems, methods, and apparatuses of the present invention may be implemented.

FIG. 6 is a block diagram of an example device with which the systems, methods, and apparatuses of the present invention may be implemented. Example device 600 may include at least one processor (e.g., processor 601*a* and/or processor 601*b*) and at least one memory (e.g., memories 605*a* and 605*b*). Processor(s) 601*a* and/or 601*b* may comprise a central processing unit (CPU), a graphics processing unit (GPU), or other similar circuitry capable of performing one or more operations on a data stream. Processor(s) 601*a* and/or 601*b* may be configured to execute instructions that may, for example, be stored on one or more of memories 605*a* and 605*b*. Memories 605*a* and 605*b* may be volatile memory (such as RAM or the like) and/or non-volatile memory (such as flash memory, a hard disk drive, or the like). As explained above, memories 605*a* and 605*b* may store instructions for execution by processor(s) 601*a* and/or 601*b*. As further depicted in FIG. 6, device 600 may include at least one network interface controller (NIC) (e.g., NIC 607). NIC 607 may be configured to facilitate communication over at least one computing network (e.g., network 609). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 607 over which device 600 is intended to operate. For example, in some embodiments, device 600 may include one or more wireless and/or wired NICs designed to operate over a GSM network, a GPRS network, an EDGE network, a Wi-Fi or WiMax network, and a Bluetooth® network. Alternatively or concurrently, device 600 may include one or more wireless and/or wired NICs designed to operate over a TCP/IP network. As depicted in FIG. 6, device 600 may include and/or be operably connected to a storage device 603. Storage device 603 may be volatile (such as RAM or the like) or non-volatile (such as flash memory, a hard disk drive, or the like). An I/O module may enable communications between processor(s) 601*a* and/or 601*b*, memories 605*a* and 605*b*, NIC 607, and/or storage device 603. Processor(s) 601*a* and/or 601*b*, memories 605*a* and 605*b*, NIC 607, and/or storage device 603 may comprise separate components or may be integrated in one or more integrated circuits. The various components in device 600 may be coupled by one or more communication buses or signal lines (not shown).

Figure 7:
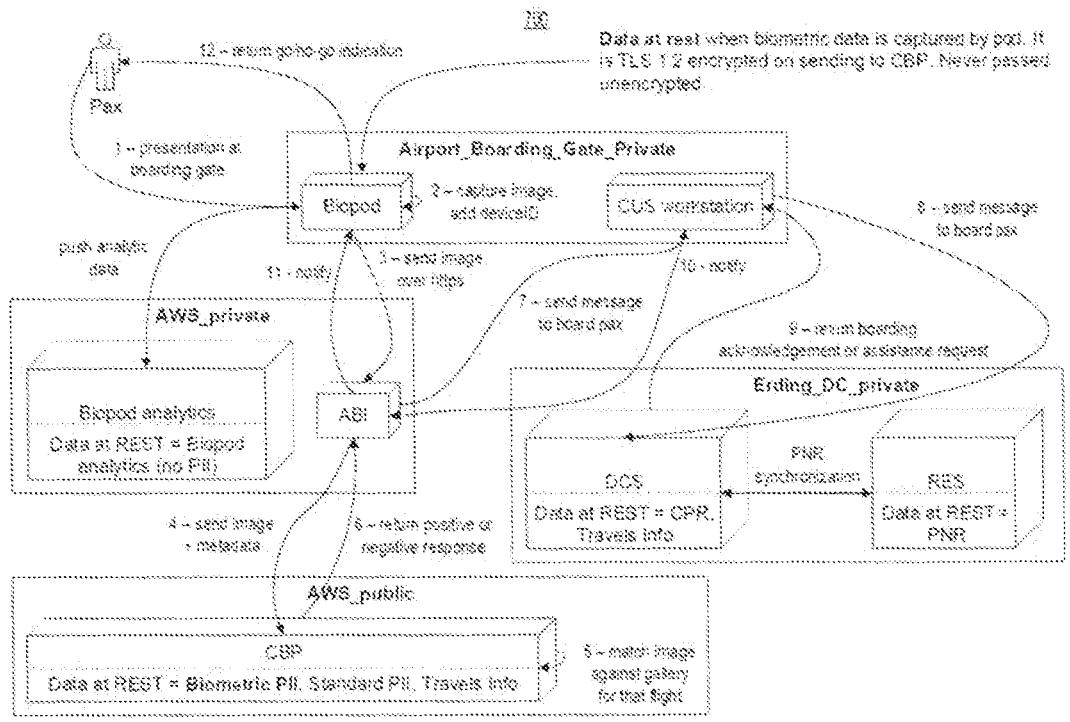
FIG. 7 represents a block diagram of an example implementation of the systems, methods, and apparatuses of the present invention in an airport environment.

FIG. 7 is a block diagram of an example implementation 700 of the systems, methods, and apparatuses of the present invention in an airport environment. As depicted in FIG. 7, a person ("Pax") may present information for verification, e.g., at a boarding gate. In the example of FIG. 7, the information comprises biometric information (e.g., a facial image, a fingerprint image, or the like) encoded in an Airport_Boarding_Gate_Private data structure. In other embodiments, additional or alternative verification information, such as a barcode, an image of a government identification, or the like.

As further shown in FIG. 7, the electronic device capturing the information (e.g., storing the same as "Biopod" in the depicted Airport_Boarding_Gate_Private data structure) may add a deviceID to the captured information and encrypt the same. For example, the electronic device may transmit the information (optionally with the deviceID) to a remote server (shown as AWS_private in FIG. 7). Although shown as using an https protocol, any secure transmission protocol may be used.

Moreover, the remote server may manage a virtual machine for the electronic device. Accordingly, as depicted in FIG. 7, an application binary interface (ABI) on the remote server may allow the virtual workstation hosted by the server to communicate with the electronic device (or a workstation connected thereto, depicted as "CUS workstation"). Accordingly, the remote server may communicate the encrypted verification information to a remote identity service, such as a customs and border patrol (CBP) machine. Using the received verification information as well as stored information (e.g., biometric personally identifiable information (PII) and/or standard PII), the remote identity service may verify an identity of the person ("Pax"). The verification may be encoded as a message (e.g., a positive or negative response) based on whether the verification was successful.

To properly handle the response from the remote identity service, the virtual workstation may forward the message from the remote identity service to a boarding service ("board pax"). Accordingly, another service that uses the electronic device (such as a departure control system (DCS), a reservation system (RES), or the like) may receive the message from the remote identity service. The virtual workstation may re-encode the message for proper processing by the service using the electronic device and/or for correct synchronization (such as passenger name record (PNR) synchronization) across relevant services.

Finally, once any services using the Erding_DC_private data structure have updated to reflect the message from the AWS_public data structure, the virtual machine may receive a notification confirming the same. In some embodiments, as further depicted in FIG. 7, the electronic device may thus communicate the acceptance or rejection from the remote identity service and/or may control an access device (such as a gate, door, or the like) in response to the notification.

In some embodiments, as further shown in FIG. 7, the remote server hosting the virtual machine (shown as using the AWS_private data structure) may collect anonymized or other de-identified analytics from the electronic device. According the analytics may be shared with the device and/or with a workstation associated with the device in order to assess functionality of the device and/or security risks captured by the device. The example of FIG. 7, although depicted as within an airport, may be used for any other environment using verification to control access, such as an academic examination, an office building, or the like. Moreover, the data structures depicted and named in FIG. 7 are exemplary; the embodiments of the present disclosure may be implemented using any appropriate number and type of data structure.

The invention claimed is:

1. A server, comprising:
at least one memory storing instructions; and
at least one processor configured to execute the instructions to:
provide an application programming interface (API) to a biometric authentication device of a first type,
boot a virtual machine configured to emulate a second type of biometric authentication device distinct from the first type, wherein the second type is selected based on a workstation connected with the server and configured to receive data from the biometric authentication device,
receive input in a first format corresponding to the first type, using the API, from the biometric authentication device,
using the virtual machine, convert the input into a predefined second format corresponding to the second type of biometric authentication device, and
provide output in the predefined second format, base n the converted input, to the workstation using the virtual machine.

2. The remote server of claim 1, wherein the input comprises at least one biometric indicator of a user.

3. The remote server of claim 2, wherein the output comprises a verification of the at least one biometric indicator.

4. The remote server of claim 3, wherein the verification further includes data regarding a scheduled flight associated with the user.

5. The remote server of claim 3, wherein the verification further includes data regarding a scheduled event associated with the user.

6. The remote server of claim 3, wherein the verification further includes data regarding a scheduled academic examination associated with the user.

7. The remote server of claim 3, wherein the output is formatted in accordance with a format associated with the workstation.

8. The remote server of claim 7, wherein the format associated with the workstation comprises an Aircraft Electronics Association format.

9. The remote server of claim 1, wherein the workstation comprises a server associated with an airline.

10. The remote server of claim 1, wherein the at least one processor is further configured, to provide the output, to:
transmit the input to a remotely hosted identity service, wherein the identity service is configured to compare the input with stored data;
in response, receive an output from the identity service, wherein the output is based on the comparison; and
reformat the output from the identity service for output to the workstation using the virtual machine.

11. The remote server of claim 10, wherein the input comprises at least one biometric indicator of a user, and wherein the at least one processor is configured to reformat the input before transmitting in accordance with a format associated with the identity service.

* * * * *